United States Patent
Baldwin et al.

(10) Patent No.: US 10,831,282 B2
(45) Date of Patent: Nov. 10, 2020

(54) GESTURE-BASED CONTROLS VIA BONE CONDUCTION

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/403,685

(22) Filed: May 6, 2019

(65) Prior Publication Data

US 2019/0258321 A1 Aug. 22, 2019

Related U.S. Application Data

(63) Continuation of application No. 15/457,620, filed on Mar. 13, 2017, now Pat. No. 10,281,991, which is a continuation of application No. 14/072,126, filed on Nov. 5, 2013, now Pat. No. 9,594,433.

(51) Int. Cl.
*G06F 3/01* (2006.01)

(52) U.S. Cl.
CPC ........ *G06F 3/017* (2013.01); *G06F 2203/014* (2013.01)

(58) Field of Classification Search
CPC ..... G06Q 30/0269; H04K 1/00; A61B 5/0026
USPC .......... 345/173, 174; 340/539.12; 705/14.67, 705/863
See application file for complete search history.

(56) References Cited

U.S. PATENT DOCUMENTS

| 3,629,521 A | 12/1971 | Puharich et al. |
| 4,048,986 A | 9/1977 | Ott |
| 4,340,778 A | 7/1982 | Cowans et al. |
| 4,421,119 A | 12/1983 | Pratt |
| 4,720,607 A | 1/1988 | de Moncuit |
| 4,754,763 A | 7/1988 | Doemland |
| 4,799,498 A | 1/1989 | Collier |

(Continued)

FOREIGN PATENT DOCUMENTS

| AU | 2003257031 | 2/2004 |
| AU | 2007200415 | 8/2007 |

(Continued)

OTHER PUBLICATIONS

U.S. Office Action dated Mar. 8, 2010 in U.S. Appl. No. 11/586,142.

(Continued)

*Primary Examiner* — Calvin C Ma
(74) *Attorney, Agent, or Firm* — Hartman & Citrin LLC

(57) ABSTRACT

Concepts and technologies are disclosed herein for utilizing bone conduction to detect gestures. According to one aspect, a device can generate a signal and send the signal to a sensor network that is connected to a user. The device can receive a modified signal from the sensor network. The modified signal can include the signal as modified by a body of the user. The device can compare the modified signal to the signal to determine a difference in a feature between the signal and the modified signal. The device can determine a gesture performed by the user based upon the difference in the feature between the signal and the modified signal.

20 Claims, 9 Drawing Sheets

(56) References Cited

U.S. PATENT DOCUMENTS

| | | |
|---|---|---|
| 4,988,981 A | 1/1991 | Zimmerman et al. |
| 5,024,239 A | 6/1991 | Rosenstein |
| 5,073,950 A | 12/1991 | Colbert et al. |
| 5,125,313 A | 6/1992 | Hiyoshi et al. |
| 5,319,747 A | 6/1994 | Gerrissen et al. |
| 5,327,506 A | 7/1994 | Stites, III |
| 5,368,044 A | 11/1994 | Cain et al. |
| 5,495,241 A | 2/1996 | Doing et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,766,208 A | 6/1998 | Mcewan |
| 5,810,731 A | 9/1998 | Sarvazyan et al. |
| 5,813,406 A | 9/1998 | Kramer et al. |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,154,199 A | 11/2000 | Butler |
| 6,213,934 B1 | 4/2001 | Bianco |
| 6,234,975 B1 | 5/2001 | Mcleod et al. |
| 6,336,045 B1 | 1/2002 | Brooks |
| 6,380,923 B1 | 4/2002 | Fukumoto |
| 6,396,930 B1 | 5/2002 | Vaudrey et al. |
| 6,409,684 B1 | 6/2002 | Wilk |
| 6,507,662 B1 | 1/2003 | Brooks |
| 6,515,669 B1 | 2/2003 | Mohri |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,844,660 B2 | 1/2005 | Scott |
| 6,898,299 B1 | 5/2005 | Brooks |
| 6,912,287 B1 | 6/2005 | Fukumoto et al. |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,908,894 B2 | 12/2014 | Amento |
| 8,922,427 B2 | 12/2014 | Dehnie et al. |
| 9,031,293 B2 | 5/2015 | Kalinli-Akbacak |
| 9,386,962 B2 | 7/2016 | Dahl |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0207599 A1 | 9/2005 | Fukumoto et al. |
| 2005/0210269 A1 | 9/2005 | Tiberg |
| 2006/0018488 A1 | 1/2006 | Viala et al. |
| 2006/0132455 A1 | 6/2006 | Rimas-Ribikauskas |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0084859 A1 | 4/2008 | Sullivan |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1 | 9/2009 | Kim |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0304210 A1 | 12/2009 | Weisman |
| 2009/0309751 A1 | 12/2009 | Kano et al. |
| 2010/0016741 A1 | 1/2010 | Mix et al. |
| 2010/0066664 A1* | 3/2010 | Son .................. G06F 1/163 |
| | | 345/156 |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1 | 6/2011 | Oda |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1 | 10/2011 | Weising |
| 2011/0269601 A1 | 11/2011 | Nelson et al. |
| 2011/0276312 A1 | 11/2011 | Shalon et al. |
| 2011/0280239 A1 | 11/2011 | Tung et al. |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0143693 A1 | 6/2012 | Chung et al. |
| 2012/0202479 A1 | 8/2012 | Sugitani et al. |
| 2012/0212441 A1 | 8/2012 | Christiansson et al. |
| 2012/0280900 A1* | 11/2012 | Wang .................. G06F 3/017 |
| | | 345/156 |
| 2012/0290832 A1 | 11/2012 | Antequera Rodriguez et al. |
| 2012/0293410 A1* | 11/2012 | Bell .................. G06F 3/014 |
| | | 345/158 |
| 2013/0034238 A1 | 2/2013 | Abolfathi |
| 2013/0041235 A1 | 2/2013 | Rogers et al. |
| 2013/0097292 A1 | 4/2013 | Yoakum et al. |

(56) References Cited

U.S. PATENT DOCUMENTS

| | | | |
|---|---|---|---|
| 2013/0119133 | A1 | 5/2013 | Michael et al. |
| 2013/0120458 | A1 | 5/2013 | Celebisoy et al. |
| 2013/0135223 | A1 | 5/2013 | Shai |
| 2013/0170471 | A1 | 7/2013 | Nix |
| 2013/0171599 | A1 | 7/2013 | Bleich et al. |
| 2013/0173926 | A1 | 7/2013 | Morese et al. |
| 2013/0212648 | A1 | 8/2013 | Tietjen et al. |
| 2013/0215060 | A1 | 8/2013 | Nakamura |
| 2013/0225915 | A1 | 8/2013 | Redfield et al. |
| 2013/0225940 | A1 | 8/2013 | Fujita et al. |
| 2013/0257804 | A1 | 10/2013 | Vu et al. |
| 2013/0278396 | A1 | 10/2013 | Kimmel |
| 2013/0288655 | A1 | 10/2013 | Foruntanpour et al. |
| 2013/0346620 | A1 | 12/2013 | Gizis et al. |
| 2014/0009262 | A1 | 1/2014 | Robertson et al. |
| 2014/0028604 | A1 | 1/2014 | Morinaga et al. |
| 2014/0035884 | A1 | 2/2014 | Oh et al. |
| 2014/0097608 | A1 | 4/2014 | Buzhardt et al. |
| 2014/0099991 | A1 | 4/2014 | Cheng et al. |
| 2014/0107531 | A1 | 4/2014 | Baldwin |
| 2014/0156854 | A1 | 6/2014 | Gaetano, Jr. |
| 2014/0168093 | A1 | 6/2014 | Lawrence |
| 2014/0168135 | A1 | 6/2014 | Saukko et al. |
| 2014/0174174 | A1 | 6/2014 | Uehara et al. |
| 2014/0188561 | A1 | 7/2014 | Tenbrock et al. |
| 2014/0210791 | A1 | 7/2014 | Hanauer et al. |
| 2014/0240124 | A1 | 8/2014 | Bychkov |
| 2014/0364967 | A1* | 12/2014 | Sullivan .............. G06F 3/165 700/83 |
| 2015/0084011 | A1 | 3/2015 | Park et al. |
| 2015/0092962 | A1 | 4/2015 | Amento et al. |
| 2015/0105159 | A1* | 4/2015 | Palotas .............. G06F 3/011 463/37 |
| 2015/0120465 | A1 | 4/2015 | Baldwin et al. |
| 2015/0137936 | A1 | 5/2015 | Baldwin et al. |
| 2015/0137960 | A1 | 5/2015 | Baldwin et al. |
| 2015/0138062 | A1 | 5/2015 | Baldwin et al. |
| 2015/0150116 | A1 | 5/2015 | Baldwin et al. |
| 2015/0199950 | A1 | 7/2015 | Heiman |
| 2015/0297140 | A1* | 10/2015 | Hernandez .......... A61B 5/6897 600/547 |
| 2016/0042228 | A1* | 2/2016 | Opalka ............... G06F 3/01 382/103 |
| 2016/0066834 | A1 | 3/2016 | Baldwin et al. |
| 2016/0071382 | A1 | 3/2016 | Baldwin et al. |
| 2016/0071383 | A1 | 3/2016 | Baldwin et al. |
| 2016/0073296 | A1 | 3/2016 | Baldwin et al. |
| 2016/0109951 | A1 | 4/2016 | Baldwin et al. |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 10/1990 |
| TW | 200946887 | 8/1997 |
| WO | WO 8201329 | 4/1982 |
| WO | WO 9601585 | 1/1996 |
| WO | WO 2003033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision dated Sep. 25, 2014 in U.S. Appl. No. 11/586,142.
U.S. Notice of Allowance dated Jun. 18, 2014 in U.S. Appl. No. 11/586,142.
U.S. Office Action dated Aug. 25, 2015 in U.S. Appl. No. 11/586,142.
U.S. Office Action dated Feb. 13, 2013 in U.S. Appl. No. 13/309,124.
U.S. Office Action dated Sep. 24, 2013 in U.S. Appl. No. 13/309,124.
U.S. Office Action dated Jan. 29, 2014 in U.S. Appl. No. 13/309,124.
U.S. Office Action dated Dec. 17, 2015 in U.S. Appl. No. 14/065,663.
U.S. Office Action dated Apr. 7, 2017 in U.S. Appl. No. 14/065,663.
U.S. Notice of Allowance dated Aug. 21, 2017 in U.S. Appl. No. 14/065,663.
U.S. Office Action dated Feb. 25, 2016 in U.S. Appl. No. 14/072,126.
U.S. Office Action dated Jul. 7, 2016 in U.S. Appl. No. 14/072,126.
U.S. Notice of Allowance dated Oct. 13, 2016 in U.S. Appl. No. 14/072,126.
U.S. Office Action dated Aug. 25, 2015 in U.S. Appl. No. 14/083,094.
U.S. Office Action dated Jan. 9, 2019 in U.S. Appl. No. 14/083,094.
U.S. Office Action dated Jun. 25, 2015 in U.S. Appl. No. 14/083,110.
U.S. Office Action dated Nov. 19, 2015 in U.S. Appl. No. 14/083,499.
U.S. Notice of Allowance dated Apr. 4, 2016 in U.S. Appl. No. 14/083,499.
U.S. Office Action dated Nov. 19, 2015 in U.S. Appl. No. 14/090,668.
U.S. Notice of Allowance dated Mar. 21, 2016 in U.S. Appl. No. 14/090,668.
U.S. Office Action dated Oct. 20, 2016 in U.S. Appl. No. 14/482,078.
U.S. Office Action dated Jun. 1, 2017 in U.S. Appl. No. 14/482,078.
U.S. Office Action dated Mar. 16, 2016 in U.S. Appl. No. 14/482,087.
U.S. Office Action dated Mar. 10, 2016 in U.S. Appl. No. 14/482,091.
U.S. Notice of Allowance dated Jul. 12, 2016 in U.S. Appl. No. 14/482,091.
U.S. Office Action dated Sep. 14, 2016 in U.S. Appl. No. 14/482,101.
U.S. Notice of Allowance dated Nov. 17, 2017 in U.S. Appl. No. 14/482,101.
U.S. Office Action dated Jan. 11, 2016 in U.S. Appl. No. 14/514,658.
U.S. Office Action dated Dec. 14, 2016 in U.S. Appl. No. 14/561,549.
U.S. Office Action dated Aug. 17, 2016 in U.S. Appl. No. 15/161,499.
U.S. Office Action dated May 10, 2017 in U.S. Appl. No. 15/161,499.
U.S. Notice of Allowance dated Oct. 7, 2016 in U.S. Appl. No. 15/224,808.
U.S. Notice of Allowance dated Mar. 28, 2017 in U.S. Appl. No. 15/224,808.
U.S. Office Action dated Dec. 13, 2017 in U.S. Appl. No. 15/250,375.
U.S. Office Action dated Apr. 5, 2018 in U.S. Appl. No. 15/250,375.
U.S. Office Action dated Apr. 21, 2017 in U.S. Appl. No. 15/450,624.
U.S. Notice of Allowance dated Aug. 22, 2017 in U.S. Appl. No. 15/450,624.
U.S. Office Action dated Mar. 22, 2018 in U.S. Appl. No. 15/450,624.
U.S. Office Action dated May 16, 2018 in U.S. Appl. No. 15/457,620.
U.S. Notice of Allowance dated Nov. 28, 2018 in U.S. Appl. No. 15/457,620.
Zhong et al., "OsteoConduct: Wireless Body-Area Communication based on Bone Conduction," Proceeding of the ICST 2nd International Conference on Body Area Networks, BodyNets 2007.
Travis et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Yamada, Guillaume Lopez; Masaki Shuzo; Ichiro. "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
Amento et al., "The Sound of One Hand: A Wrist-Mounted Bio-Acoustic Fingertip Gesture Interface," Short Talk: It's All About Sound, CHI 2002.

(56) References Cited

OTHER PUBLICATIONS

"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Kompis, Martin, and Rudolf Haeusler, "Electromagnetic interference of bone-anchored hearing aids by cellular phones revisited," Acta oto-laryngologica 122.5, 2002, 510-512.
Chris Harrison, Desney Tan, Dan Morris, "Skinput: Appropriating the Skin as an Interactive Canvas," CommuniCations of the ACM 54.8, 2011, 111-118.
T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air-and Bone-Conductive Microphones," Multimedia Signal Processing, 2004 IEEE 6th Workshop, IEEE, 2004.
Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.
Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.
Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
Hinckley, Ken, and Hyunyoung Song, "Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intrabody communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body," http://www.iiis.org/cds2010/cd2010imc/ccct_2010/paperspdf/ta303gi.pdf, CCCT 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
Fukumoto et al., "Whisper: A Wristwatch Style Wearable Headset," CHI 99, May 1999, pp. 112-119.
Fukumoto et al., "Body Coupled FingeRing Wireless Wearable Keyboard," CHI 97, Mar. 1997, pp. 147-154.
Matsushita et al., "Wearable Key Device for Personalizing Nearby Environment, Proceedings of the Fourth International Symposium on Wearable Computers" (ISWC'00), Feb. 2000, pp. 1-8.

\* cited by examiner

GESTURE-BASED CONTROLS VIA BONE CONDUCTION

CROSS-REFERENCE TO RELATED APPLICATIONS

This application is a continuation of and claims priority to U.S. Patent Application No. 15/457,620, entitled Gesture-Based Controls Via Bone Conduction," filed Mar. 13, 2017, now U.S. Pat. No. 10,281,991, which is a continuation of and claims priority to U.S. Patent Application No. 14/072,126, entitled "Gesture-Based Controls Via Bone Conduction," filed Nov. 5, 2013, now U.S. Pat. No. 9,594,433, which are incorporated herein by reference in their entireties

BACKGROUND

Human interface devices allow humans to interact with computer systems and devices to carry out various tasks. Traditional human interface devices such as the ubiquitous mouse and keyboard are still commonly used, but are now being replaced or supplemented with more advanced human interface devices that aim to make human and computer interaction more natural for users. One such human interface device that has experienced significant growth in popularity over the last several years, due in large part to the surge of smartphone devices, is the multi-touch touchscreen. Multi-touch touchscreens allow single and multiple touch inputs, including gestures that are often more intuitive and thus easier to learn, particularly for children and elderly users.

A new trend is emerging in human interface device technologies in which a user and the human interface device are no longer required to physically interact. Voice recognition technology is one area that has greatly improved in recent years and allows a user to provide complex inputs using natural spoken language. Other human interface devices utilize cameras with gesture recognition functionality that allows a user to perform gestures in space without having to physically interact with a human interface device. KINECT, available from MICROSOFT CORPORATION, is one such device.

SUMMARY

Concepts and technologies are disclosed herein for utilizing bone conduction to detect gestures. According to one aspect, a device can generate a signal and send the signal to a sensor network that is connected to a user. The device can receive a modified signal from the sensor network. The modified signal can include the signal as modified by a body of the user. The device can compare the modified signal to the signal to determine a difference in a feature between the signal and the modified signal. The device can determine a gesture performed by the user based upon the difference in the feature between the signal and the modified signal.

In some embodiments, the sensor network includes a plurality of vibration sensors. The signal can be propagated through one or more bones of the user by at least one vibration sensor of the plurality of vibration sensors.

In some embodiments, the device can generate instructions that are indicative of the gesture performed by the user. The device can send the instructions that are indicative of the gesture performed by the user to an application executing on the device. The application may provide native support for the gesture. Alternatively, the application may map the instructions to a native input of the application, which may be another gesture-based input such as multi-touch gestures.

In some embodiments, the device can create a user gesture profile based upon a physical attribute of the user. The gesture performed by the user may be determined based, at least in part, upon the user gesture profile.

In some embodiments, the device can perform a gesture learning process. In particular, the device can generate a test signal and send the test signal to the sensor network. The device can prompt the user to perform a pre-defined gesture. The device can receive a modified test signal from the sensor network while the user performs the pre-defined gesture. The modified test signal can include the test signal as modified by the body of the user during performance of the pre-defined gesture. The device can compare the modified test signal to the test signal to determine a difference in a feature between the test signal and the modified test signal. The device can associate the difference in the feature between the test signal and the modified test signal with the pre-defined gesture and update a user gesture profile accordingly.

In some embodiments, the gesture includes a static gesture. In some other embodiments, the gesture includes a movement gesture. For the latter, the device can generate a plurality of signals and send the plurality signals to the sensor network in succession (e.g., one signal every X milliseconds). The device can receive a plurality of modified signals from the sensor network in succession, where each of the plurality of modified signals is indicative of a frame of motion of the movement gesture.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
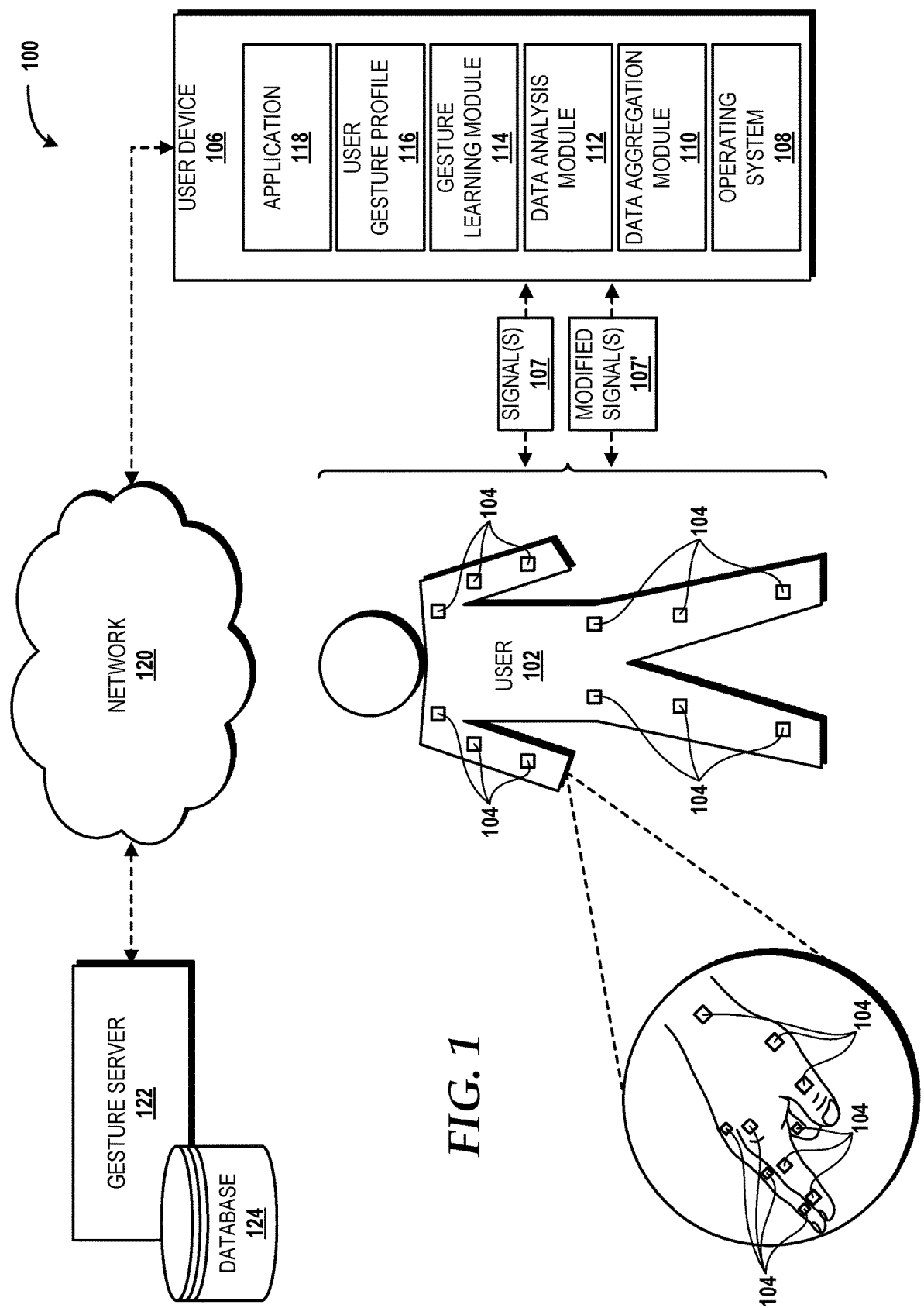
FIG. 1 is a block diagram illustrating aspects of an illustrative operating environment for various concepts disclosed herein.

The following detailed description is directed to gesture-based controls via bone conduction. According to one aspect, a device can generate a signal and send the signal to a sensor network that is connected to a user. The device can receive a modified signal from the sensor network. The modified signal can include the signal as modified by a body of the user. The device can compare the modified signal to the signal to determine a difference in a feature between the signal and the modified signal. The device can determine a gesture performed by the user based upon the difference in the feature between the signal and the modified signal.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of gesture-based controls via bone conduction will be presented.

Referring now to FIG. 1, aspects of an operating environment 100 in which various embodiments presented herein may be implemented will be described. The operating environment 100 shown in FIG. 1 includes a user 102, a plurality of sensors 104, and a user device 106 associated with the user 102. The plurality of sensors 104 may form a sensor network positioned at various locations on the user's 102 body. A sensor network alternatively may include a single sensor 104. In the illustrated example, the plurality of sensors 104 are shown on the user's 102 arms, waist, legs, and one of the user's 102 hands. It should be understood, however, that one or more of the plurality of sensors 104 may be positioned on or within any part of the user's 102 body, including the head, neck, and other areas not specifically illustrated in FIG. 1. Accordingly, the illustrated example should not be construed as being limiting in any way. In some implementations, one or more of the plurality of sensors 104 are implanted within the user's 102 body so as to be in direct contact with one or more bones of the user 102.

In some embodiments, the sensor network is in communication with the user device 106 via one or more wired connections, which may be facilitated by any wired communications technology, some examples of which include Universal Serial Bus ("USB"), Ethernet, optical, Institute of Electrical and Electronics Engineers ("IEEE") 1374 ("FIREWIRE"), serial technologies, parallel technologies, proprietary technologies, and combinations thereof. In some other embodiments, the sensor network is in communication with the user device 106 via one or more wireless connections, which may be facilitated by any wireless communications technology, some examples of which include IEEE 802.11, IEEE 802.15, IEEE 1451, wireless USB, BLUETOOTH, ZIGBEE, International Society of Automation ("ISA") 100.11a, proprietary technologies, and combinations thereof.

One or more of the plurality of sensors 104 can receive one or more signals 107 from the user device 106, transmit the signal(s) 107 through at least a portion of the user's 102 body, and return modified signal(s) 107' to the user device 106. The modified signal(s) 107' include the signal(s) 107 as modified by the user's 102 body. The user device 106 can analyze the modified signal(s) 107' to determine a position of the user's 102 body and/or portions thereof.

In some embodiments, the user device 106 sends the signal(s) 107 to at least one of the plurality of sensors 104, which receive the signal(s) 107 and send the signal(s) 107 through the user's 102 body. As the signal(s) 107 propagate through the user's 102 body, features of the user's 102 body cause the signal(s) 107 to be modified, thereby creating the modified signal(s) 107'. At least one of the plurality of sensors 104 receives the modified signal(s) 107' and sends the modified signal(s) 107' to the user device 106.

In some embodiments, the user device 106 sends the signal(s) 107 to the user's 102 body, which modifies the signal(s) 107, thereby creating the modified signal(s) 107'. The modified signal(s) 107' is/are then received by at least one of the plurality of sensors 104, which send the modified signal(s) 107' to the user device 106.

In some embodiments, the user device 106 sends the signal(s) 107 to at least one of the plurality of sensors 104, which receive the signal(s) 107 and send the signal(s) 107 through the user's 102 body. As the signal(s) 107 propagate through the user's 102 body, features of the user's 102 body cause the signal(s) 107 to be modified, thereby creating the modified signal(s) 107'. The same sensor(s) of the plurality of sensors 104 receives the modified signal(s) 107' and sends the modified signal(s) 107' to the user device 106.

The position of the user's 102 body and/or portions thereof can be indicative of a static gesture being performed by the user 102. A static gesture may be isolated or may involve the user's 102 interaction with one or more objects, such as the user 102 holding or touching one or more objects. A static gesture may include a symbolic gesture, such as a gesture used in static sign language. Other static gestures may be full body gestures or partial body gestures in which the user 102 moves one or more of his or her body parts into a static position for a period of time.

A static gesture can be utilized by the user device 106 as input for one or more applications. In some implementations, an application developer may define one or more static gestures for use as input for an application. In some other implementations, an application developer may select one or more static gestures from a set of one or more pre-defined static gestures. The pre-defined static gestures may be implemented, for example, as part of a software development kit ("SDK") for use in developing software on a specific platform.

The position of the user's 102 body and/or portions thereof can be indicative of a movement gesture being performed by the user 102. For movement gestures, the signals 107 can be sent in succession (e.g., every X milliseconds) to the user's 102 body, and the modified signals 107' received from the user's 102 body can each be representative of an instance in time and a position of the user's 102 body at that instance. In other words, the modified signals 107' may each be representative of a frame of motion as the user 102 performs a movement gesture.

A movement gesture may be isolated or may involve the user's 102 interaction with one or more objects, such as the user 102 moving or pointing to one or more objects. A movement gesture may include a symbolic gesture, such as a gesture used in sign language. A movement gesture may include a deictic gesture, such as, for example, pointing or directing one or more individuals to turn their attention to an event or object within an environment. A movement gesture may include an iconic gesture, such as, for example, a gesture used to convey information about the size, shape, and/or orientation of an object of discussion. A movement gesture may include a pantomimic gesture, such as, for example, a gesture used to convey the use of an invisible object.

A movement gesture can be utilized by the user device 106 as input for one or more applications. In some implementations, an application developer may define one or more movement gestures for use as input for an application. In some other implementations, an application developer may select one or more movement gestures from a set of one or more pre-defined movement gestures. The pre-defined movement gestures may be implemented, for example, as part of an SDK for use in developing software on a specific platform.

The plurality of sensors 104, in some embodiments, are vibrations sensors that vibrate in accordance with the signal (s) 107 to send vibrations through one or more bones of the user's 102 body in accordance with a bone conduction technique. The vibration sensors may be piezoelectric transducers, such as contact microphones, other electro-acoustic transducers, or a combination thereof.

The signal(s) 107 each may have amplitude, frequency, and/or phase characteristics that are designed or "tuned" to the user's 102 body attributes. For example, a user's height, weight, body fat percentage, body muscle percentage, and/or bone characteristics such as bone density and bone mass, as well as the placement of the plurality of sensors 104 on or within the user's 102 body, can affect the vibrations transmitted by and/or received from individual sensors of the plurality of sensors 104, and so the signals sent through the user's 102 body can be generated taking into account the user's 102 body attributes. The user's 102 body attributes may be used, at least in part, to create a user gesture profile as will be described in greater detail below with reference to FIG. 2.

It should be understood that the use of bone conduction techniques eliminates certain environmental drawbacks of other techniques that utilize electrical signals. Indeed, the use of vibration sensors inherently relies on acoustic signals that are unaffected by environmental characteristics, such as, for example, temperature and humidity. Although bone conduction techniques are described herein as the primary techniques by which signals are transmitted throughout the user's 102 body, other techniques such as skin conduction may be utilized to enhance or fine tune gesture information derived from one or more signals received by the user device 106 after the signal(s) 107 have traversed at least a portion of the user's 102 body.

The user device 106 may be a smartphone, feature phone, personal digital assistant ("PDA"), tablet device, laptop computer, desktop computer, server computer, video game system, handheld video game system, media player, set-top box, vehicle computing system, smart watch, personal tracker or safety device, other computing system, other computing device, a combination thereof, or the like. It should be understood that the functionality of the user device 106 can be provided by a single device, by two or more similar devices, and/or by two or more dissimilar devices. For purposes of describing the concepts and technologies disclosed herein, the user device 106 is described as a mobile telephone, such as a smartphone. It should be understood that this embodiment is illustrative, and should not be construed as being limiting in any way.

The illustrated user device 106 includes an operating system 108, a data aggregation module 110, a data analysis module 112, a gesture learning module 114, a user gesture profile 116, and an application 118. The user device 106 can execute the operating system 108, the data aggregation module 110, the data analysis module 112, the gesture learning module 114, and the application 118. The operating system 108 is a program for controlling the operation of the user device 106. The data aggregation module 110, the data analysis module 112, the gesture learning module 114, and the application 118 include computer-executable instructions that are configured to execute on top of the operating system 108 to provide various functions described herein. In some embodiments, all or at least a portion of the instructions included in the data aggregation module 110, the data analysis module 112, the gesture learning module 114 and/or the application 118 are encoded in the operating system 108.

The data aggregation module 110 can be executed by one or more processors (not illustrated in FIG. 1, but illustrated and described below with reference to FIG. 7) of the user device 106 to perform various operations described herein for generating one or more signals 107, transmitting the signal(s) 107 to the user's 102 body, where the signal(s) 107 propagate through the user's 102 body from one sensor 104 to another within the sensor network provided by the plurality of sensors 104, and aggregating data associated with the modified signal(s) 107' received from one or more of the plurality of sensors 104. The data aggregation module 110 also provides the aggregated data to the data analysis module 112.

The data analysis module 112 can be executed by one or more processors (not illustrated in FIG. 1, but illustrated and described below with reference to FIG. 7) to determine a position of the user's 102 body and/or portions thereof. The position of the user's 102 body and/or portions thereof may be indicative of a static gesture being performed by the user 102. The position of the user's 102 body and/or portions thereof as the user 102 moves can be analyzed and determined to be indicative of a frame of a movement gesture being performed by the user 102. The gesture can be utilized by the user device 106 as input for one or more applications as will be described below in more detail.

The gesture learning module 114 can be executed by one or more processors (not illustrated in FIG. 1, but illustrated and described below with reference to FIG. 7) to learn one or more unique mannerisms of the user 102 when the user 102 performs one or more gestures. The gesture learning module 114 can populate the user gesture profile 116 with the results of a learning process during which the unique mannerisms of the user 102 are identified and associated with one or more gestures performed by the user 102. The gesture learning module 114 is described herein below in greater detail with reference to FIG. 4.

The user gesture profile 116 can include one or more attributes of the user 102, including, but not limited to, weight, height, age, length of legs, length of arms, waist size, other dimensions of the user's 102 body or portions thereof, and the like. The user gesture profile 116 can also include anomalies with the user's 102 performance of one or more gestures. By way of example, and not limitation, the user 102 may have a physical or other impairment that causes the user 102 to perform an action that is indicative of a gesture that another user may perform to convey a different gesture, but because of the user's 102 physical or other impairment, this action is not indicative of the other gesture for the user 102, and so may be flagged as such within the user gesture profile 116. Such anomalies can be determined by the gesture learning module 114.

Although the data aggregation module 110, the data analysis module 112, and the gesture learning module 114 are illustrated as separate software modules that are executable by one or more processors of the user device 106, the data aggregation module 110, the data analysis module 112, and the gesture learning module 114, in some embodiments, are combined into one or more modules, or may be encoded within the operating system 108, the application 118, and/or one or more other applications (not shown). As such, the illustrated embodiment of the data aggregation module 110, the data analysis module 112, and the gesture learning module 114 as distinct components is but one example configuration, and should not be construed as limiting in any way.

The application 118 is configured to execute on top of the operating system 108 to provide various functions. The application 118 may be any type of application, some examples of which include, but are not limited to, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like.

The application 118 can support one or more gestures as input. In some embodiments, the application 118 receives instructions indicative of a gesture performed by the user 102 from the data analysis module 112. The application 118, in these embodiments, processes the instructions to determine an input being provided by the gesture. In response, the application 118 can perform one or more functions. The application 118 can provide native support for bone conduction gestures as input and/or can map gestures to inputs for which the application 118 has native support. For example, touch gestures typically provided via a touchscreen can be mapped to bone conduction gestures so that bone conduction gestures can be used in lieu of or in addition to touch gestures to provide input to the application 118.

The user device 106 can operate in communication with and/or as part of a communications network ("network") 120. The network 120 is illustrated and described in greater detail herein below with reference to FIG. 9.

The user device 106 can communicate with a gesture server 122 over the network 120. In some embodiments, the gesture server 122 creates, at least in part, the user gesture profile 116 and sends the user gesture profile 116 to the user device 106. The gesture server 122 may also update the user gesture profile 116 from time to time based upon new information received from the gesture learning module 114. The user gesture profile 116 may be stored in a database 124 operating on or in communication with the gesture server 122.

The gesture server 122, in some embodiments, additionally or alternatively is used to manage user data associated with the user 102 stored in the database 124 as part of a user account for a gesture service. It is contemplated that one or more application programming interfaces ("APIs) can be created to take advantage of functionality provided by the gesture service provided by the gesture server 122. In some embodiments, an API is called by the application 118, the data analysis module 112, and/or the gesture learning module 114 to access the user gesture profile 116 from the gesture server 122. In these embodiments, the user gesture profile 116 does not need to be stored locally on the user device 106, although the user gesture profile 116 may be at least partially cached at the user device 106 for faster access by the application 118, the data analysis module 112, and/or the gesture learning module 114.

In some embodiments, one or more gesture learning models are created through the use of signal analysis and machine learning techniques, which may be performed by the user device 106 during execution of the gesture learning module 114 and/or by the gesture server 122. For example, an acoustic signal can be sent through an individual and captured via a sensor. The individual may be the user 102 or a test individual used to generate a baseline model, which can then be modified for the user 102 based upon information obtained from the user gesture profile 116. The raw signal obtained by the sensor can be analyzed and one or more features related to a gesture can be extracted based upon analysis techniques, including, for example, wavelet analysis, cepstral analysis, and sliding window analysis for relative power and root mean square amplitude. The extracted features can then be used to train the gesture learning model(s) using machine learning-based classification. In some implementations, one or more machine learning algorithms are utilized to generate acceptable signal classifiers for features extracted from test signals. It is contemplated that the machine-learning algorithms can be deployed on the user device 106 so that the gesture learning model(s) can be modified over time based upon the user gesture profile 116 and other information related to the user's 102 body before, during, and after the user 102 performs one or more gestures.

FIG. 1 illustrates one user 102, one user device 106, one operating system 108, one data aggregation module 110, one data analysis module 112, one gesture learning module 114, one user gesture profile 116, one application 118, one network 120, one gesture server 122, and one database 124. It should be understood, however, that various implementations of the operating environment 100 include multiple users 102, multiple user devices 106, multiple operating systems 108, multiple data aggregation modules 110, multiple data analysis modules 112, multiple gesture learning modules 114, multiple user gesture profiles 116, multiple applications 118, multiple networks 120, multiple gesture servers 122, and/or multiple databases 124. As such, the illustrated embodiment should be understood as being illustrative, and should not be construed as being limiting in any way.

Figure 2:
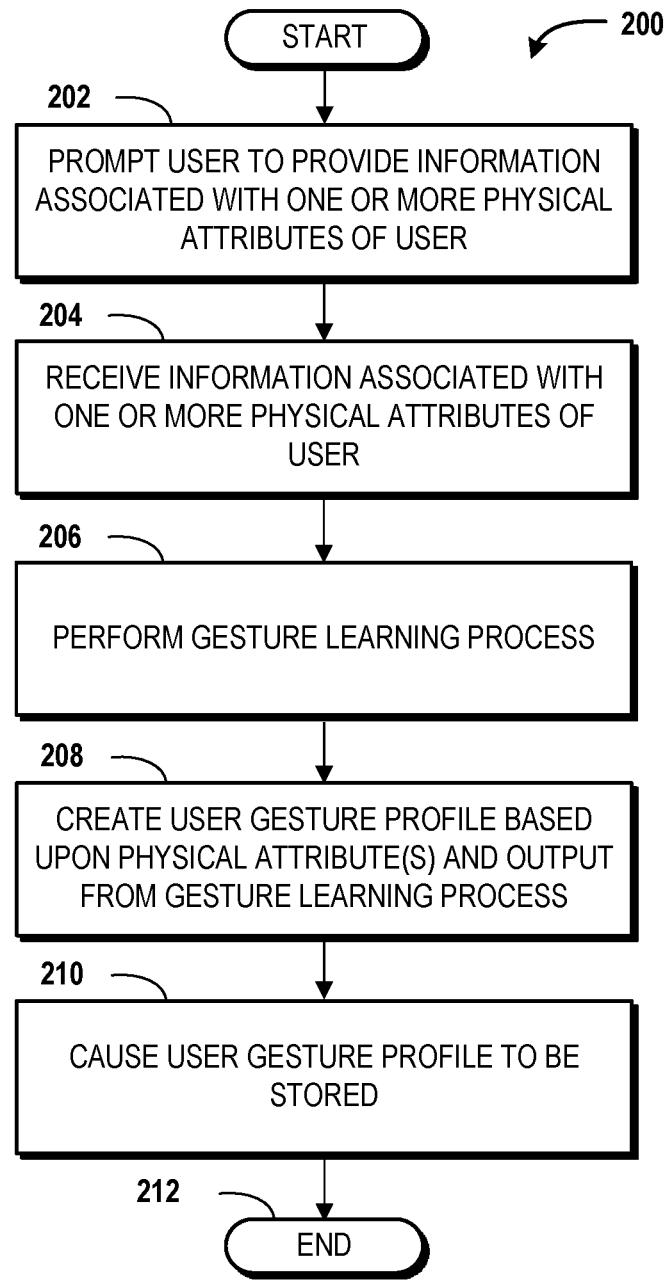
FIG. 2 is a flow diagram illustrating aspects of a method for creating a user gesture profile, according to an illustrative embodiment.

Turning now to FIG. 2, aspects of a method 200 for creating a gesture profile, such as the user gesture profile 116, will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device 106, the gesture server 122, single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as, the user device 106 and/or the gesture server 122 to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device 106, via execution of one or more software modules and/or software applications, such as the data aggregation module 110, the data analysis module 112, the gesture learning module 114, and/or the application 118. It should be understood that additional and/or alternative devices and/or network nodes, such as the gesture server 122, can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the user device 106 prompts the user 102 to provide information associated with one or more physical attributes of the user 102. The physical attributes can include, but are not limited to, the user's weight, height, age, length of legs, length of arms, waist size, other dimensions of the user's 102 body or portions thereof, combinations thereof, or the like. The user device 106 may prompt the user 102 to provide information associated with one or more physical attributes of the user 102 via a visual prompt on a display of the user device 106, via an audio prompt through a speaker of the user device 106, or a combination thereof. The user device 106 may prompt the user 102 to provide information associated with one or more physical attributes of the user 102 as part of an initial setup process conducted by the application 118 and/or the data analysis module 112. In embodiments in which the data analysis module 112 is encoded within the operating system 108, the initial setup process may be carried out through a settings menu of the operating system 108.

From operation 202, the method 200 proceeds to operation 204, where the user device 106 receives the information associated with one or more physical attributes of the user 102. The user device 106 may receive the information associated with one or more physical attributes of the user 102 via manual entry via a touchscreen, a keypad, a microphone, or other input component of the user device 106. Alternatively, the user device 106 may receive the information associated with one or more physical attributes of the user 102 from a user account that is associated with the user 102 and that is stored within the database 124 of the gesture server 122.

From operation 204, the method 200 proceeds to operation 206, where the user device 106 executes the gesture learning module 114 to perform a gesture learning process. The gesture learning process is described below with reference to FIG. 4.

From operation 206, the method 200 proceeds to operation 208, where the user device 106 creates the user gesture profile 116 based upon the information associated with one or more physical attributes of the user 102 and the output from the gesture learning process. The user gesture profile 116 can include anomalies with the user's 102 performance of one or more gestures. By way of example, and not limitation, the user 102 may have a physical or other impairment that causes the user 102 to perform a motion that is indicative of a gesture that another user may perform to convey a different gesture, but because of the user's 102 physical or other impairment, this motion is not indicative of the other gesture for the user 102, and so may be flagged as such within the user gesture profile 116. Such anomalies can be determined by the gesture learning module 114 during the gesture learning process performed at operation 206.

From operation 208, the method 200 proceeds to operation 210, where the user device 106 causes the user gesture profile 116 to be stored. The user device 106 may cause the user gesture profile 116 to be stored locally in a storage component of the user device 106 and/or may cause the user gesture profile 116 to be stored in the database 124 of the gesture server 122.

From operation 210, the method 200 proceeds to operation 212. The method 200 ends at operation 212.

Figure 3:
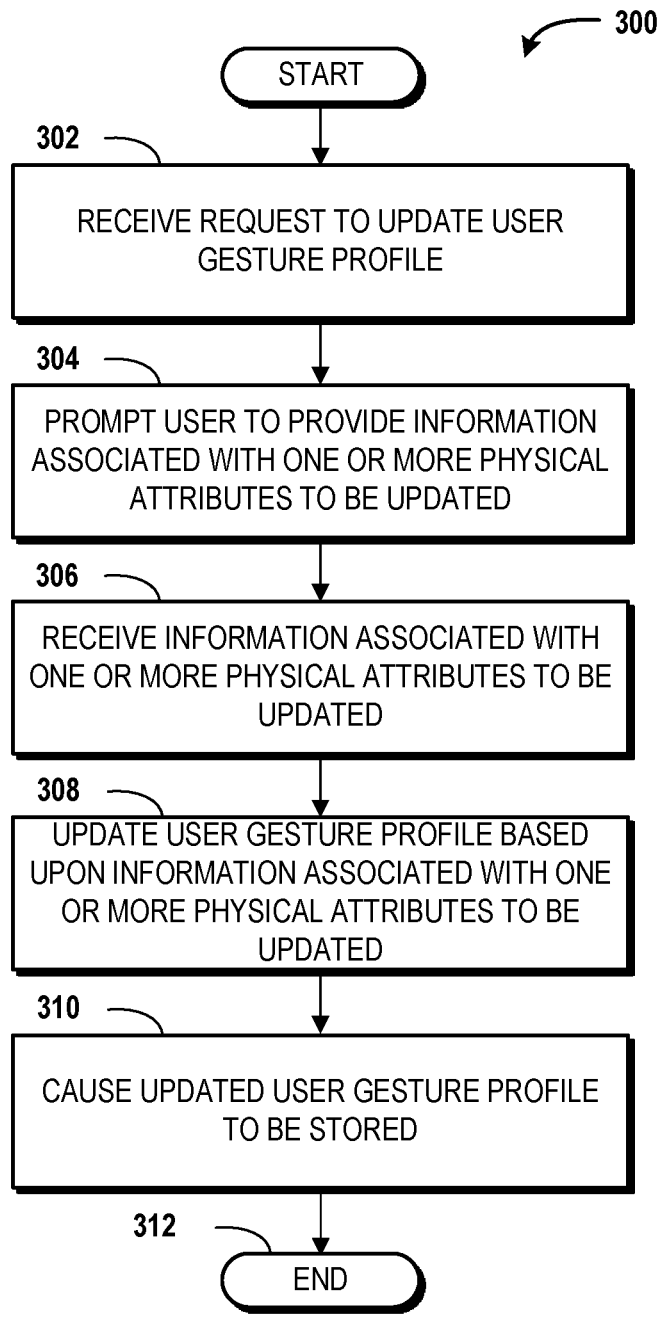
FIG. 3 is a flow diagram illustrating aspects of a method for updating a user gesture profile, according to an illustrative embodiment.

Turning now to FIG. 3, a method 300 for updating a user gesture profile, such as the user gesture profile 116, will be described in detail, according to an illustrative embodiment. The method 300 will be described with reference to FIG. 3 and FIG. 1.

The method 300 begins and proceeds to operation 302, where the user device 106 receives a request to update the user gesture profile 116. The request may be received from the user 102, from an application, such as the application 118 executing on the user device 106, or from an external source.

The external source may be a remote application, such as an application executing on the gesture server 122. The external source may be a device that is in communication with the user device 106 via the network 120 and/or via a local network, such as a BLUETOOTH, ZIGBEE, WI-FI, or other local or personal area network. The device may be, for example, a smart scale that is configured to weigh the user 102 and send the user's 102 weight to the user device 106. The smart scale may format the weight as a request to update the user gesture profile 116 for the user 102, or the smart scale may merely send the weight to the user device 106 based upon a configuration setting, and the user device 106 may interpret this as a request to update the user gesture profile 116.

From operation 302, the method 300 proceeds to operation 304, where the user device 106 prompts the user 102 to provide information associated with one or more physical attributes of the user 102. Operation 304 may be performed in response to the user 102 requesting to update the user gesture profile 116 or an application requesting that the user 102 update the user gesture profile 116. For embodiments in which the request is received from an external source, the operation 304 is not performed, although it is contemplated that the user 102 may modify information provided by the external source.

From operation 304, the method 300 proceeds to operation 306, where the user device 106 receives the information associated with one or more physical attributes of the user 102 to be updated. The user device 106 may receive the information associated with one or more physical attributes of the user 102 to be updated via manual entry via a touchscreen, a keypad, a microphone, or other input component of the user device 106. Alternatively, the user device 106 may receive the information associated with one or more physical attributes of the user 102 to be updated from a user account associated with the user 102 and stored within the database 124 of the gesture server 122. An external device, such as a smart scale, may additionally or alternatively provide the information associated with one or more physical attributes of the user 102 to be updated.

From operation 306, the method 300 proceeds to operation 308, where the user device 106 updates the user gesture profile 116 based upon the information associated with one or more physical attributes of the user 102 to be updated. From operation 308, the method 300 proceeds to operation 310, where the user device 106 causes the user gesture profile 116 as updated to be stored. The user device 106 may cause the user gesture profile 116 to be stored locally in a storage component the user device 106 and/or may cause the user gesture profile 116 to be stored in the database 124 of the gesture server 122.

From operation 310, the method 300 proceeds to operation 312. The method 300 ends at operation 312.

Figure 4:
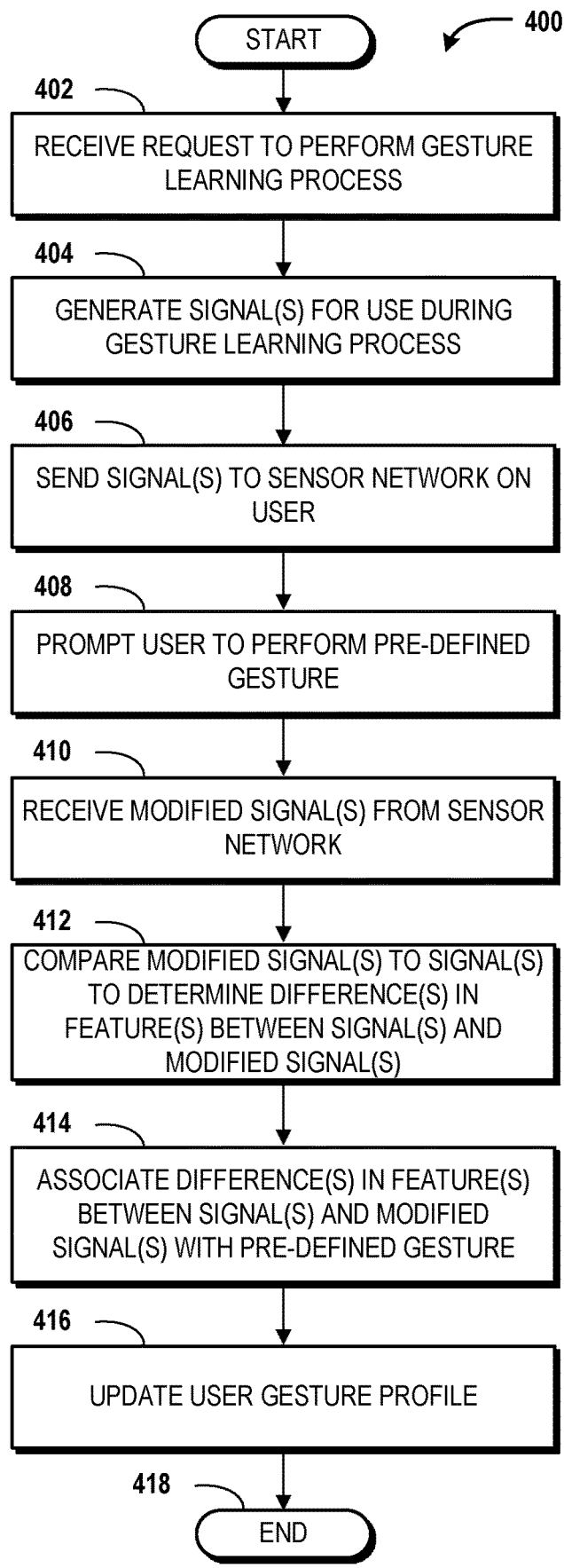
FIG. 4 is a flow diagram illustrating aspects of a method for learning gestures, according to an illustrative embodiment.

Turning now to FIG. 4, a method 400 for learning gestures will be described in detail, according to an illustrative embodiment. The method 400 will be described with reference to FIG. 4 and FIG. 1.

The method 400 begins and proceeds to operation 402, where the user device 106 receives a request to perform a gesture learning process. From operation 402, the method 400 proceeds to operation 404, where the user device 106 generates one or more signals, such as the signal(s) 107, for use during the gesture learning process. From operation 404, the method 400 proceeds to operation 406, where the user device 106 sends the signal(s) 107 to one or more of the plurality of sensors 104.

From operation 406, the method 400 proceeds to operation 408, where the user device 106 prompts the user to perform a pre-defined gesture. The gesture may be a static gesture or a movement gesture. The user device 106 may prompt the user 102 to perform the pre-defined gesture via a visual prompt on a display of the user device 106, via an audio prompt through a speaker of the user device 106, or a combination thereof. The user device 106 may prompt the user 102 to perform the pre-defined gesture as part of an initial setup process conducted by the application 118 and/or the data analysis module 112. In embodiments in which the data analysis module 112 is encoded within the operating system 108, the initial setup process may be carried out through a settings menu of the operating system 108.

From operation 408, the method 400 proceeds to operation 410, where the user device 106 receives a modified version of each of the signal(s) 107, such as the modified signal(s) 107', from one or more of the plurality of sensors 104. The modified signal(s) 107' include the signal(s) 107 as modified by the user's 102 body.

From operation 410, the method 400 proceeds to operation 412, where the user device 106 compares the modified signal(s) 107' to the signal(s) 107 to determine one or more differences in one or more features of the modified signal(s) 107' and the signal(s) 107. In some embodiments, the modified signal(s) 107' received from one or more of the plurality of sensors 104 can be analyzed and one or more features can be extracted based upon analysis techniques, including, for example, wavelet analysis, cepstral analysis, and sliding window analysis for relative power and root mean square amplitude. The extracted features can then be used to train a gesture learning model using machine learning-based classification. In some implementations, one or more machine learning algorithms are utilized to generate acceptable signal classifiers for features extracted from the modified signal(s) 107'. It is contemplated that the machine-learning algorithms can be deployed on the user device 106 so that a gesture learning model can be modified over time based upon the user gesture profile 116 and other information related to the user's 102 body before, during, and after the user 102 performs a gesture.

From operation 412, the method 400 proceeds to operation 414, where the user device 106 associates the difference(s) in one or more feature(s) between the signal(s) 107 and the modified signal(s) 107' with the pre-defined gesture that the user was prompted to perform at operation 408. From operation 414, the method 400 proceeds to operation 416, where the user device 106 updates the user gesture profile 116 so that when the user 102 performs the pre-defined gesture, the user device 102 can determine that the user 102 performed the pre-defined gesture based upon features extracted from the modified signal(s) 107'.

From operation 416, the method 400 proceeds to operation 418. The method 400 ends at operation 418.

Figure 5:
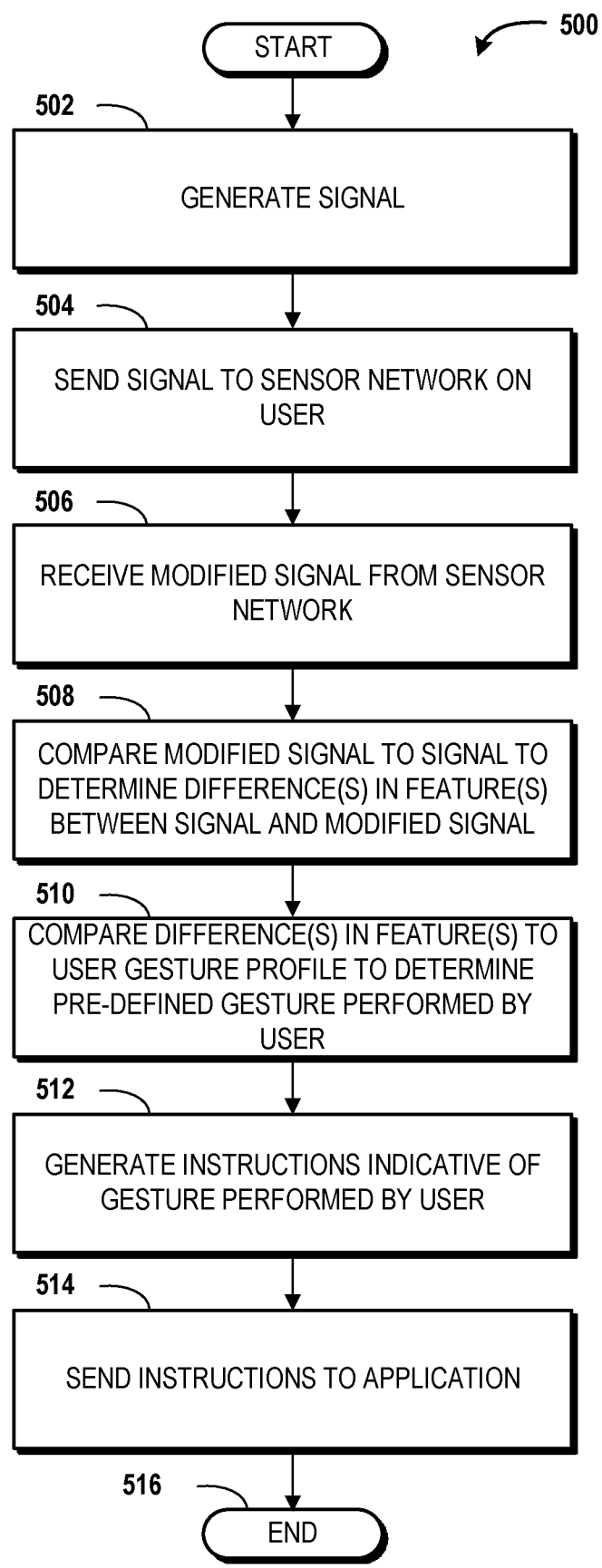
FIG. 5 is a flow diagram illustrating aspects of a method for determining a gesture performed by a user, according to an illustrative embodiment.

Turning now to FIG. 5, a method 500 for determining a gesture performed by a user, such as the user 102, will be described in detail, according to an illustrative embodiment. The method 500 will be described with reference to FIG. 5 and FIG. 1.

The method 500 begins and proceeds to operation 502, where the user device 106, and more particularly the data aggregation module 110, generates a signal, such as the signal 107. The signal 107 may be generated based upon the user gesture profile 116 and considering information associated with one or more the physical attributes of the user 102 as obtained during the initial setup process described above with reference to the method 200 illustrated in FIG.

2 or the update process described above with reference to the method 300 illustrated in FIG. 3. In general, the signal 107 is generated with amplitude, frequency, and/or phase characteristics conducive for transfer through the user's 102 body based upon information stored in the user gesture profile 116. If a user gesture profile 116 is not available for the user 102, a default signal may be generated. In some implementations, even without a user gesture profile 116, the user device 106 may prompt the user 102 to input height, weight, and/or other physical attributes to further tune the signal 107 to the user 102. At operation 502, the data aggregation module 110 may generate multiple signals 107, each of which is intended to capture a frame of motion as the user 102 performs a movement gesture.

From operation 502, the method 500 proceeds to operation 504, where the user device 106, and more particularly the data aggregation module 110, sends the signal 107 to the sensor network formed by the plurality of sensors 104 placed on and/or within the user's 102 body. For embodiments in which multiple signals are used to capture a movement gesture, the user device 106, and more particularly the data aggregation module 110, may send the signals 107 in rapid succession (e.g., every X milliseconds) to the sensor network formed by the plurality of sensors 104 placed on and/or within the user's 102 body. From operation 504, the method 500 proceeds to operation 506, where the user device 106, and more particularly the data aggregation module 110, receives the modified signal 107' from the sensor network. The modified signal 107' includes the signal 107 as modified by the user's 102 body. For embodiments in which multiple signals are used to capture a movement gesture, the user device 106, and more particularly the data aggregation module 110, may receive the modified signals 107 from the sensor network.

From operation 506, the method 500 proceeds to operation 508, where the user device 106, and more particularly the data analysis module 112, compares the modified signal 107' to the signal 107 to determine one or more differences in one or more features between the signal 107 and the modified signal 107' as modified by the user's 102 body. For embodiments in which multiple signals are used to capture a movement gesture, the user device 106, and more particularly the data aggregation module 110, the differences may be determined for each signal to determine a frame of motion of the movement gesture.

From operation 508, the method 500 proceeds to operation 510, where the user device 106, and more particularly the data analysis module 112 compares the difference(s) in the feature(s) of the signal(s) 107 and the modified signal(s) 107' to the user gesture profile 116 to determine the predefined gesture performed by the user 102.

From operation 510, the method 500 proceeds to operation 512, where the user device 106, and more particularly the data analysis module 112, generates instructions indicative of the gesture performed by the user 102. The instructions can be useable by one or more applications, such as the application 118, as input.

From operation 512, the method 500 proceeds to operation 514, where the data analysis module 112 sends the instructions to an application, such as the application 118. The application 118 can then perform one or more functions in response to the instructions.

From operation 514, the method 500 proceeds to operation 516. The method 500 ends at operation 516.

Figure 6:
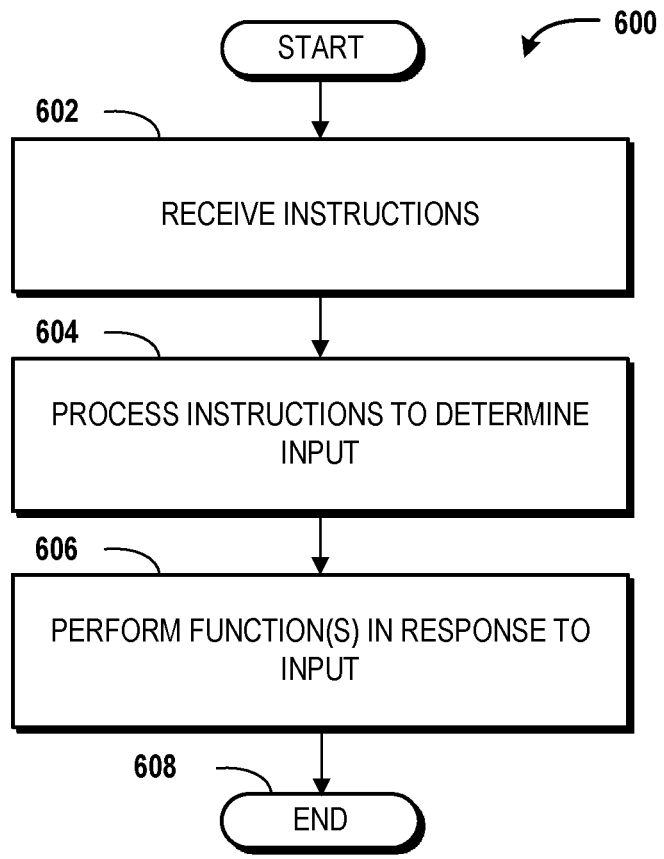
FIG. 6 is a flow diagram illustrating aspects of a method for processing instructions associated with a gesture to determine an input, according to an illustrative embodiment.

Turning now to FIG. 6, a method 600 for processing instructions associated with a gesture to determine an input will be described, according to an illustrative embodiment. The method 600 will be described with reference to FIG. 6 and FIG. 1.

The method 600 begins and proceeds to operation 602, where the application 118 executing on the user device 106 receives the instructions generated in operation 512 of the method 500, described above. From operation 602, the method 600 proceeds to operation 604, where the application 118 processes the instructions to determine an input being represented by the instructions. In some embodiments, the application 118 provides native support for bone conduction gestures, and as such, the instructions can identify the bone conduction gesture performed by the user 102. In some other embodiments, the application 118 does not provide native support for bone conduction gestures. In these embodiments, the instructions can include information regarding a direction of movement, a speed, an acceleration, and/or other parameters that can be utilized by the application 118 as input. The instructions may additionally or alternatively mimic gestures for which the application 118 provides native support. For example, the application 118 may support touch gestures that are typically received via a touchscreen or touchpad of the user device 106. These touch gestures can be mapped to one or more bone conduction gestures so the application 118 processes the bone conduction gestures in the same manner as the corresponding touch gestures.

From operation 604, the method 600 proceeds to operation 606, where the application 118 performs one or more functions in response to the input determined at operation 606. The functions can include any functions capable of being performed by the application 118 in response to an input.

From operation 606, the method 600 proceeds to operation 608. The method 600 ends at operation 608.

Figure 7:
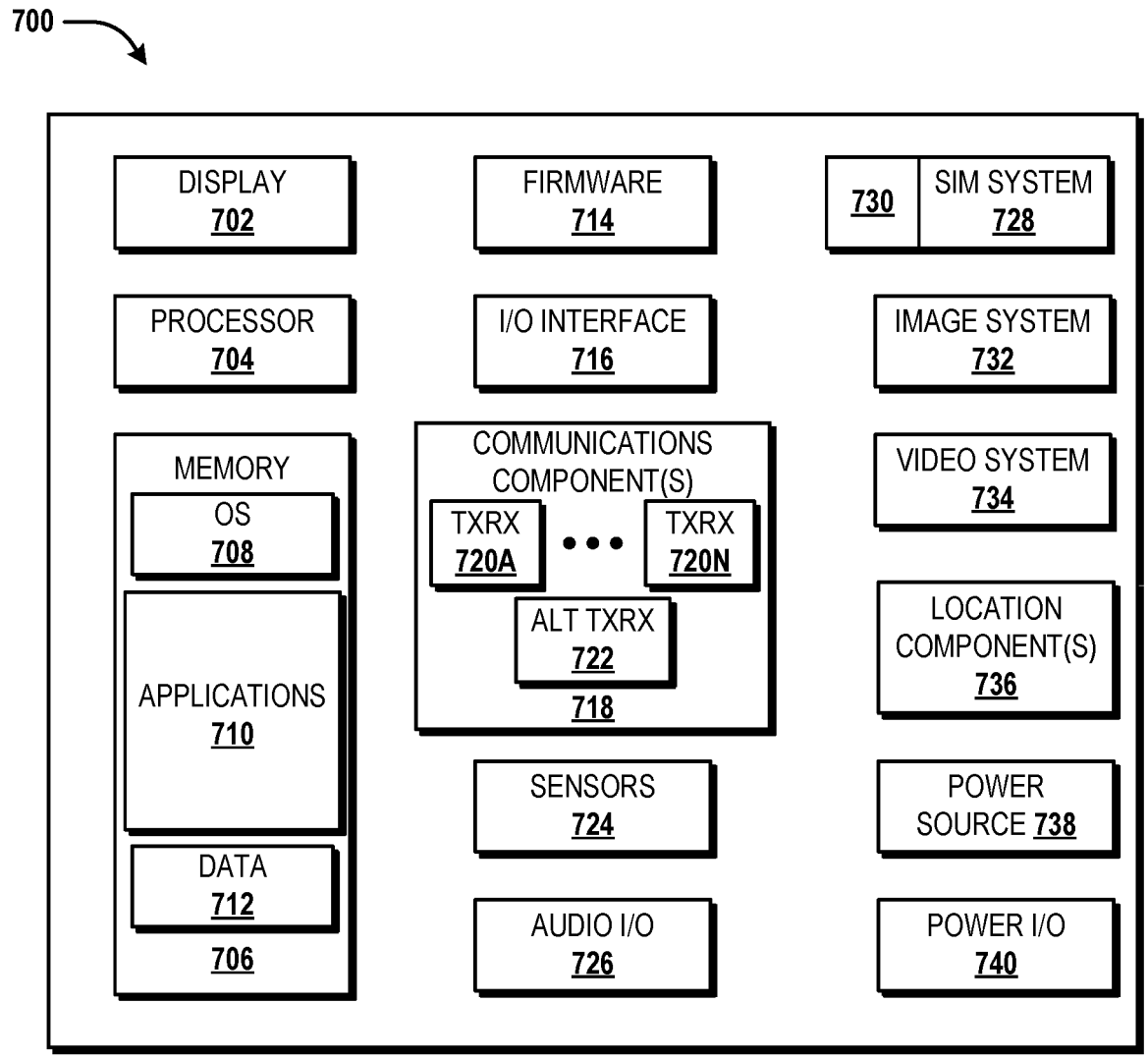
FIG. 7 is a block diagram illustrating an example mobile device capable of implementing aspects of the embodiments disclosed herein.

Turning now to FIG. 7, an illustrative mobile device 700 and components thereof will be described. In some embodiments, the user device 106 described above with reference to FIG. 1 can be configured as and/or can have an architecture similar or identical to the mobile device 700 described herein in FIG. 7. It should be understood, however, that the user device 106 may or may not include the functionality described herein with reference to FIG. 7. While connections are not shown between the various components illustrated in FIG. 7, it should be understood that some, none, or all of the components illustrated in FIG. 7 can be configured to interact with one other to carry out various device functions. In some embodiments, the components are arranged so as to communicate via one or more busses (not shown). Thus, it should be understood that FIG. 7 and the following description are intended to provide a general understanding of a suitable environment in which various aspects of embodiments can be implemented, and should not be construed as being limiting in any way.

As illustrated in FIG. 7, the mobile device 700 can include a display 702 for displaying data. According to various embodiments, the display 702 can be configured to display various graphical user interface ("GUI") elements, text, images, video, advertisements, gesture profile settings, gesture profile setup prompts, virtual keypads and/or keyboards, messaging data, notification messages, metadata, internet content, device status, time, date, calendar data, device preferences, map and location data, combinations thereof, and the like. The mobile device 700 also can include a processor 704 and a memory or other data storage device ("memory") 706. The processor 704 can be configured to process data and/or can execute computer-executable instructions stored in the memory 706. The computer-executable instructions executed by the processor 704 can include, for example, an operating system 708 (e.g., the operating system 108), one or more applications 710 (e.g., the data aggregation module 110, the data analysis module 112, and the context-aware application 118), other computer-executable instructions stored in a memory 706, or the like. In some embodiments, the applications 710 also can include a UI application (not illustrated in FIG. 7).

The UI application can interface with the operating system 708 to facilitate user interaction with functionality and/or data stored at the mobile device 700 and/or stored elsewhere. In some embodiments, the operating system 708 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 704 to aid a user in entering content, viewing account information, answering/initiating calls, entering/deleting data, entering and setting user IDs and passwords for device access, configuring settings, manipulating address book content and/or settings, multimode interaction, interacting with other applications 710, and otherwise facilitating user interaction with the operating system 708, the applications 710, and/or other types or instances of data 712 that can be stored at the mobile device 700. The data 712 can include, for example, the gesture models, the user gesture profile 116, and/or other applications or program modules. According to various embodiments, the data 712 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 710, the data 712, and/or portions thereof can be stored in the memory 706 and/or in a firmware 714, and can be executed by the processor 704. The firmware 714 also can store code for execution during device power up and power down operations. It can be appreciated that the firmware 714 can be stored in a volatile or non-volatile data storage device including, but not limited to, the memory 706 and/or a portion thereof.

The mobile device 700 also can include an input/output ("I/O") interface 716. The I/O interface 716 can be configured to support the input/output of data such as location information, user information, organization information, presence status information, user IDs, passwords, and application initiation (start-up) requests. In some embodiments, the I/O interface 716 can include a hardwire connection such as USB port, a mini-USB port, a micro-USB port, an audio jack, a PS2 port, an IEEE 1374 ("FIREWIRE") port, a serial port, a parallel port, an Ethernet (RJ45) port, an RJ11 port, a proprietary port, combinations thereof, or the like. In some embodiments, the mobile device 700 can be configured to synchronize with another device to transfer content to and/or from the mobile device 700. In some embodiments, the mobile device 700 can be configured to receive updates to one or more of the applications 710 via the I/O interface 716, though this is not necessarily the case. In some embodiments, the I/O interface 716 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 716 may be used for communications between the mobile device 700 and a network device or local device.

The mobile device 700 also can include a communications component 718. The communications component 718 can be configured to interface with the processor 704 to facilitate wired and/or wireless communications with one or more networks such as the network 122 described above herein. In some embodiments, other networks include networks that utilize non-cellular wireless technologies such as WI-FI or WIMAX. In some embodiments, the communications component 718 includes a multimode communications subsystem for facilitating communications via the cellular network and one or more other networks.

The communications component 718, in some embodiments, includes one or more transceivers. The one or more transceivers, if included, can be configured to communicate over the same and/or different wireless technology standards with respect to one another. For example, in some embodiments one or more of the transceivers of the communications component 718 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 718 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 718 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed High-Speed Uplink Packet Access ("HSUPA"), HSPA+, and various other current and future wireless data access standards. In the illustrated embodiment, the communications component 718 can include a first transceiver ("TxRx") 720A that can operate in a first communications mode (e.g., GSM). The communications component 718 also can include an $N^{th}$ transceiver ("TxRx") 720N that can operate in a second communications mode relative to the first transceiver 720A (e.g., UMTS). While two transceivers 720A-N (hereinafter collectively and/or generically referred to as "transceivers 720") are shown in FIG. 7, it should be appreciated that less than two, two, and/or more than two transceivers 720 can be included in the communications component 718.

The communications component 718 also can include an alternative transceiver ("Alt TxRx") 722 for supporting other types and/or standards of communications. According to various contemplated embodiments, the alternative transceiver 722 can communicate using various communications technologies such as, for example, WI-FI, WIMAX, BLUETOOTH, infrared, IRDA, NFC, other RF technologies, combinations thereof, and the like.

In some embodiments, the communications component 718 also can facilitate reception from terrestrial radio networks, digital satellite radio networks, internet-based radio service networks, combinations thereof, and the like. The communications component 718 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 700 also can include one or more sensors 724. The sensors 724 can include temperature sensors, light sensors, air quality sensors, movement sensors, orientation sensors, noise sensors, proximity sensors, or the like. As such, it should be understood that the sensors 724 can include, but are not limited to, accelerometers, magnetometers, gyroscopes, infrared sensors, noise sensors, microphones, combinations thereof, or the like. Additionally, audio capabilities for the mobile device 700 may be provided by an audio I/O component 726. The audio I/O component 726 of the mobile device 700 can include one or more speakers for the output of audio signals, one or more microphones for the collection and/or input of audio signals, and/or other audio input and/or output devices.

The illustrated mobile device 700 also can include a subscriber identity module ("SIM") system 728. The SIM system 728 can include a universal SIM ("USIM"), a universal integrated circuit card ("UICC") and/or other identity devices. The SIM system 728 can include and/or can be connected to or inserted into an interface such as a slot interface 730. In some embodiments, the slot interface 730 can be configured to accept insertion of other identity cards or modules for accessing various types of networks. Additionally, or alternatively, the slot interface 730 can be configured to accept multiple subscriber identity cards. Because other devices and/or modules for identifying users and/or the mobile device 700 are contemplated, it should be understood that these embodiments are illustrative, and should not be construed as being limiting in any way.

The mobile device 700 also can include an image capture and processing system 732 ("image system"). The image system 732 can be configured to capture or otherwise obtain photos, videos, and/or other visual information. As such, the image system 732 can include cameras, lenses, charge-coupled devices ("CCDs"), combinations thereof, or the like. The mobile device 700 may also include a video system 734. The video system 734 can be configured to capture, process, record, modify, and/or store video content. Photos and videos obtained using the image system 732 and the video system 734, respectively, may be added as message content to an MMS message, email message, and sent to another mobile device. The video and/or photo content also can be shared with other devices via various types of data transfers via wired and/or wireless communication devices as described herein.

The mobile device 700 also can include one or more location components 736. The location components 736 can be configured to send and/or receive signals to determine a geographic location of the mobile device 700. According to various embodiments, the location components 736 can send and/or receive signals from GPS devices, A-GPS devices, WI-FI/WIMAX and/or cellular network triangulation data, combinations thereof, and the like. The location component 736 also can be configured to communicate with the communications component 718 to retrieve triangulation data for determining a location of the mobile device 700. In some embodiments, the location component 736 can interface with cellular network nodes, telephone lines, satellites, location transmitters and/or beacons, wireless network transmitters and receivers, combinations thereof, and the like. In some embodiments, the location component 736 can include and/or can communicate with one or more of the sensors 724 such as a compass, an accelerometer, and/or a gyroscope to determine the orientation of the mobile device 700. Using the location component 736, the mobile device 700 can generate and/or receive data to identify its geographic location, or to transmit data used by other devices to determine the location of the mobile device 700. The location component 736 may include multiple components for determining the location and/or orientation of the mobile device 700.

The illustrated mobile device 700 also can include a power source 738. The power source 738 can include one or more batteries, power supplies, power cells, and/or other power subsystems including alternating current ("AC") and/or direct current ("DC") power devices. The power source 738 also can interface with an external power system or charging equipment via a power I/O component 740. Because the mobile device 700 can include additional and/or alternative components, the above embodiment should be understood as being illustrative of one possible operating environment for various embodiments of the concepts and technologies described herein. The described embodiment of the mobile device 700 is illustrative, and should not be construed as being limiting in any way.

Figure 8:
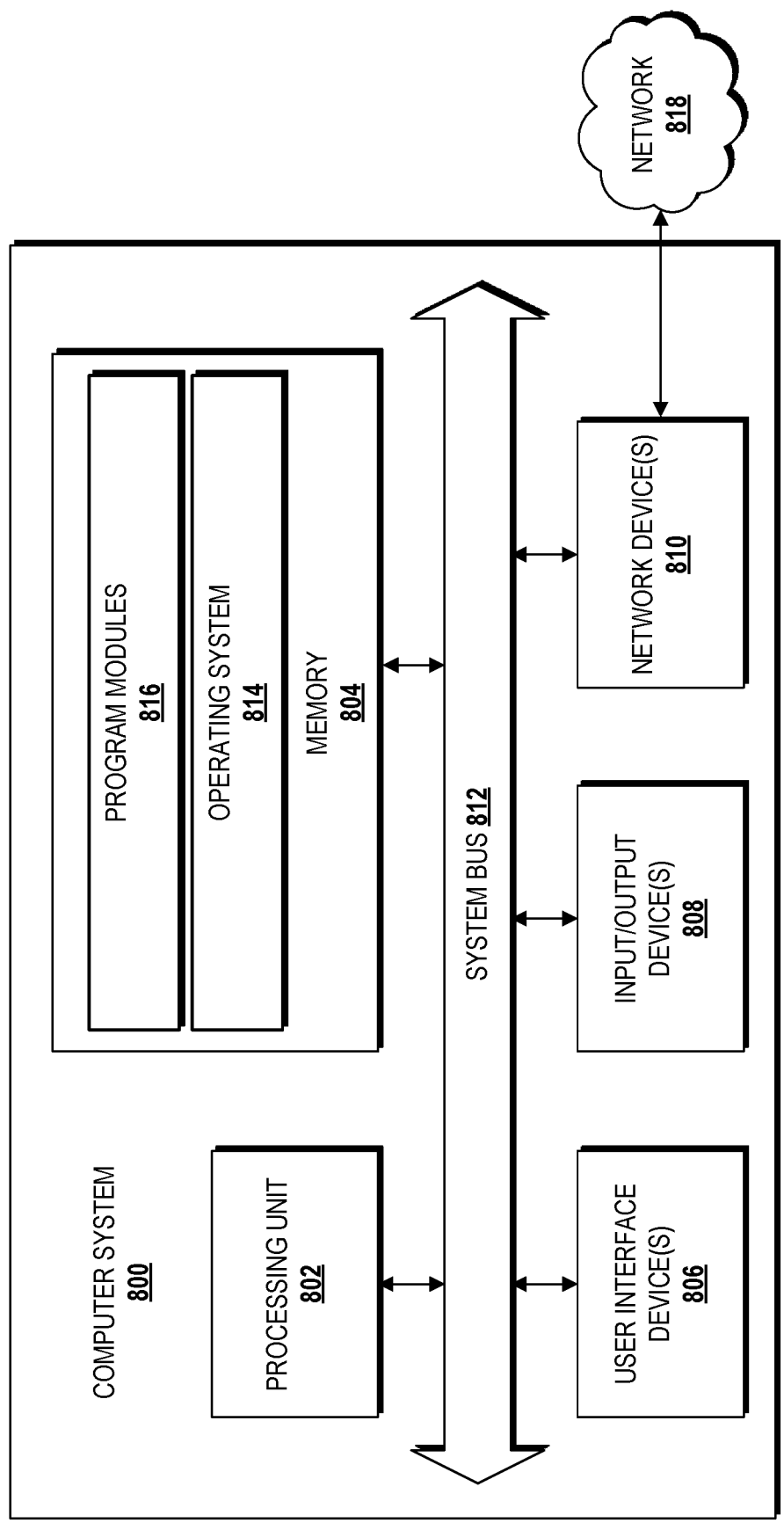
FIG. 8 is a block diagram illustrating an example computer system capable of implementing aspects of the embodiments presented herein.

FIG. 8 is a block diagram illustrating a computer system 800 configured to provide the functionality in accordance with various embodiments of the concepts and technologies disclosed herein. In some implementations, the user device 106 and/or the gesture server 122 utilize an architecture that is the same as or similar to the architecture of the computer system 800. It should be understood, however, that modification to the architecture may be made to facilitate certain interactions among elements described herein.

The computer system 800 includes a processing unit 802, a memory 804, one or more user interface devices 806, one or more input/output ("I/O") devices 808, and one or more network devices 810, each of which is operatively connected to a system bus 812. The bus 812 enables bi-directional communication between the processing unit 802, the memory 804, the user interface devices 806, the I/O devices 808, and the network devices 810.

The processing unit 802 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 804 communicates with the processing unit 802 via the system bus 812. In some embodiments, the memory 804 is operatively connected to a memory controller (not shown) that enables communication with the processing unit 802 via the system bus 812. The memory 804 includes an operating system 814 and one or more program modules 816. The operating system 814 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, iOS, and/or LEOPARD families of operating systems from APPLE CORPORATION, the FREEBSD family of operating systems, the SOLARIS family of operating systems from ORACLE CORPORATION, other operating systems, and the like.

The program modules 816 may include various software and/or program modules to perform the various operations described herein, such as those described with reference to one or more of the methods 200-600. The program modules 816 and/or other programs can be embodied in computer-readable media containing instructions that, when executed by the processing unit 802, perform one or more of the methods 200-600 or a portion thereof, described in detail above with respect to FIGS. 2-6. According to embodiments, the program modules 816 may be embodied in hardware, software, firmware, or any combination thereof. Although not shown in FIG. 8, it should be understood that the memory 804 also can be configured to store the user database 124 and/or other data, if desired.

By way of example, and not limitation, computer-readable media may include any available computer storage media or communication media that can be accessed by the computer system 800. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 800. In the claims, the phrase "computer storage medium" and variations thereof does not include waves or signals per se and/or communication media.

The user interface devices 806 may include one or more devices with which a user accesses the computer system 800. The user interface devices 806 may include, but are not limited to, computers, servers, personal digital assistants, cellular phones, or any suitable computing devices. The I/O devices 808 enable a user to interface with the program modules 816. In one embodiment, the I/O devices 808 are operatively connected to an I/O controller (not shown) that enables communication with the processing unit 802 via the system bus 812. The I/O devices 808 may include one or more input devices, such as, but not limited to, a keyboard, a mouse, or an electronic stylus. Further, the I/O devices 808 may include one or more output devices, such as, but not limited to, a display screen or a printer.

The network devices 810 enable the computer system 800 to communicate with other networks or remote systems via a network 818. Examples of the network devices 810 include, but are not limited to, the network 120, a modem, a radio frequency ("RF") or infrared ("IR") transceiver, a telephonic interface, a bridge, a router, or a network card. The network 818 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 818 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 9:
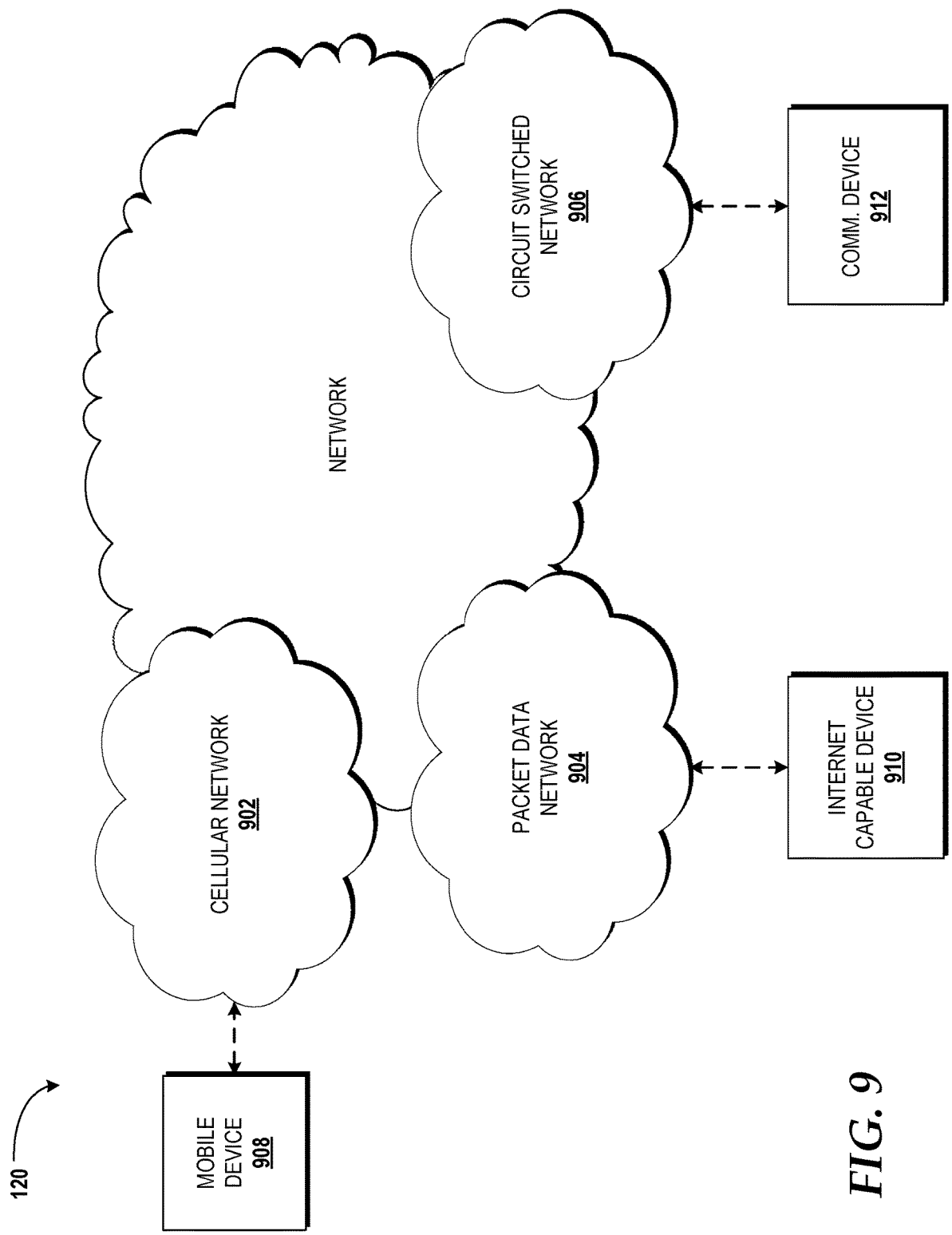
FIG. 9 schematically illustrates a network, according to an illustrative embodiment.

Turning now to FIG. 9, additional details of the network 120 are illustrated, according to an illustrative embodiment. The network 120 includes a cellular network 902, a packet data network 904, for example, the Internet, and a circuit switched network 906, for example, a publicly switched telephone network ("PSTN"). The cellular network 902 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 902 also includes radios and nodes for receiving and transmitting voice, data, and combinations thereof to and from radio transceivers, networks, the packet data network 904, and the circuit switched network 906.

A mobile communications device 908, such as, for example, a cellular telephone, a user equipment, a mobile terminal, a PDA, a laptop computer, a handheld computer, the user device 106, and combinations thereof, can be operatively connected to the cellular network 902. The cellular network 902 can be configured as a 2G GSM network and can provide data communications via GPRS and/or EDGE. Additionally, or alternatively, the cellular network 902 can be configured as a 3G UMTS network and can provide data communications via the HSPA protocol family, for example, HSDPA, EUL (also referred to as HSUPA), and HSPA+. The cellular network 902 also is compatible with 4G mobile communications standards such as LTE, or the like, as well as evolved and future mobile standards.

The packet data network 904 includes various devices, for example, servers, computers, databases, and other devices in communication with one another, as is generally known. The packet data network 904 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 904 includes or is in communication with the Internet. The circuit switched network 906 includes various hardware and software for providing circuit switched communications. The circuit switched network 906 may include, or may be, what is often referred to as a plain old telephone system (POTS). The functionality of a circuit switched network 906 or other circuit-switched network are generally known and will not be described herein in detail.

The illustrated cellular network 902 is shown in communication with the packet data network 904 and a circuit switched network 906, though it should be appreciated that this is not necessarily the case. One or more Internet-capable devices 910, for example, the user device 106, a PC, a laptop, a portable device, or another suitable device, can communicate with one or more cellular networks 902, and devices connected thereto, through the packet data network 904. It also should be appreciated that the Internet-capable device 910 can communicate with the packet data network 904 through the circuit switched network 906, the cellular network 902, and/or via other networks (not illustrated).

As illustrated, a communications device 912, for example, a telephone, facsimile machine, modem, computer, the user device 106, or the like, can be in communication with the circuit switched network 906, and therethrough to the packet data network 904 and/or the cellular network 902. It should be appreciated that the communications device 912 can be an Internet-capable device, and can be substantially similar to the Internet-capable device 910. In the specification, the network 120 is used to refer broadly to any combination of the networks 902, 904, 906. It should be appreciated that substantially all of the functionality described with reference to the network 120 can be performed by the cellular network 902, the packet data network 904, and/or the circuit switched network 906, alone or in combination with other networks, network elements, and the like.

According to various implementations of the concepts and technologies described herein, the user device 106 can use any combination of the devices disclosed herein including, but not limited to, the mobile device 908, the Internet capable device 910, and/or the communication device 912 to access web pages or other resources; to access the gesture server 122; to access the database 124; to transmit the signal(s) 107 to one or more of the plurality of sensors 104; to receive the modified signal(s) 107' from one or more of the plurality of sensors 104; and/or for other interactions between the user device 106, the gesture server 122, and/or the plurality of sensors 104. As such, it should be understood that the user device 106 can interact with the gesture server 122 via any number and/or combination of devices and networks. It should be understood that these examples are illustrative and therefore should not be construed as being limiting in any way.

Based on the foregoing, it should be appreciated that concepts and technologies directed to gesture-based controls via bone conduction have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting.

Various modifications and changes may be made to the subject matter described herein without following the example embodiments and applications illustrated and described, and without departing from the true spirit and scope of the embodiments of the concepts and technologies disclosed herein.

The invention claimed is:

1. A device comprising:
a processor; and
a memory that stores computer-readable instructions that, when executed by the processor, cause the processor to perform operations comprising
causing a signal to be transmitted to a body of a user,
receiving a modified signal comprising the signal, wherein the signal is received by a vibration sensor associated with the user and propagated by at least the vibration sensor through at least one bone of the body of the user, thereby modifying the signal to create the modified signal,
comparing the modified signal to the signal to determine a difference in a feature between the signal and the modified signal, wherein the difference in the feature between the signal and the modified signal is associated with a pre-defined gesture that defines the difference in the feature as being indicative of a gesture performed by the user, and
determining, based upon the difference in the feature between the signal and the modified signal being associated with the pre-defined gesture, that the user performed the gesture.

2. The device of claim 1, wherein causing the signal to be transmitted to the body of the user comprises causing the signal to be transmitted, from the device, to the at least one bone of the body of the user.

3. The device of claim 2, wherein the vibration sensor associated with the user is positioned on the body of the user.

4. The device of claim 2, wherein the vibration sensor associated with the user is in the body of the user.

5. The device of claim 1, wherein causing the signal to be transmitted to the body of the user comprises causing the signal to be transmitted, from the device, to the vibration sensor.

6. The device of claim 1, wherein the vibration sensor is part of a sensor network comprising a plurality of vibration sensors.

7. The device of claim 6, wherein at least a portion of the sensor network is on the body of the user.

8. The device of claim 6, wherein at least a portion of the sensor network is in the body of the user.

9. A system comprising:
a first device comprising
a first processor, and
a first memory that stores first computer-readable instructions that, when executed by the first processor, cause the first processor to perform first operations comprising
causing a signal to be transmitted to a body of a user; and
a second device comprising
a second processor, and
a second memory that stores second computer-readable instructions that, when executed by the second processor, cause the second processor to perform second operations comprising
receiving a modified signal comprising the signal, wherein the signal is received by a vibration sensor associated with the user and propagated by at least the vibration sensor through at least one bone of the body of the user, thereby modifying the signal to create the modified signal, comparing the modified signal to the signal to determine a difference in a feature between the signal and the modified signal, wherein the difference in the feature between the signal and the modified signal is associated with a pre-defined gesture that defines the difference in the feature as being indicative of a gesture performed by the user, and determining, based upon the difference in the feature between the signal and the modified signal being associated with the pre-defined gesture, that the user performed the gesture.

10. The system of claim 9, wherein causing the signal to be transmitted to the body of the user comprises causing the signal to be transmitted, from the first device, to the at least one bone of the body of the user.

11. The system of claim 10, wherein the vibration sensor associated with the user is positioned on the body of the user.

12. The system of claim 9, wherein causing the signal to be transmitted to the body of the user comprises causing the signal to be transmitted, from the first device, to the vibration sensor.

13. The system of claim 9, wherein the vibration sensor associated with the user is in the body of the user.

14. The system of claim 9, wherein the vibration sensor is part of a sensor network comprising a plurality of vibration sensors.

15. The system of claim 14, wherein at least a portion of the sensor network is on the body of the user.

16. The system of claim 14, wherein at least a portion of the sensor network is in the body of the user.

17. A method comprising:

causing a signal to be transmitted to a body of a user;

receiving a modified signal comprising the signal, wherein the signal is received by a vibration sensor associated with the user and propagated by at least the vibration sensor through at least one bone of the body of the user, thereby modifying the signal to create the modified signal;

comparing the modified signal to the signal to determine a difference in a feature between the signal and the modified signal, wherein the difference in the feature between the signal and the modified signal is associated with a pre-defined gesture that defines the difference in the feature as being indicative of a gesture performed by the user; and determining, based upon the difference in the feature between the signal and the modified signal being associated with the pre-defined gesture, that the user performed the gesture.

18. The method of claim 17, wherein causing the signal to be transmitted to the body of the user comprises causing, by a first device, the signal to be transmitted to the at least one bone of the body of the user.

19. The method of claim 18, wherein receiving the modified signal comprises:

receiving, by a second device, from the vibration sensor, the modified signal.

20. The method of claim 19, wherein:

comparing the signal and the modified signal comprises comparing, by the second device, the signal and the modified signal; and determining that the user performed the gesture comprises determining, by the second device, that the user performed the gesture.

* * * * *